(12) United States Patent
Kismarton

(10) Patent No.: US 9,289,949 B2
(45) Date of Patent: Mar. 22, 2016

(54) OPTIMIZED CROSS-PLY ORIENTATION IN COMPOSITE LAMINATES

(75) Inventor: Max U. Kismarton, Renton, WA (US)

(73) Assignee: THE BOEING COMPANY, Chicago, IL (US)

( * ) Notice: Subject to any disclaimer, the term of this patent is extended or adjusted under 35 U.S.C. 154(b) by 415 days.

(21) Appl. No.: 13/491,784

(22) Filed: Jun. 8, 2012

(65) Prior Publication Data

US 2013/0330503 A1    Dec. 12, 2013

(51) Int. Cl.
| | |
|---|---|
| *B32B 5/12* | (2006.01) |
| *B29C 70/20* | (2006.01) |
| *B29C 70/30* | (2006.01) |
| *B32B 5/26* | (2006.01) |
| *B29L 31/30* | (2006.01) |

(52) U.S. Cl.
CPC ............... *B29C 70/202* (2013.01); *B29C 70/30* (2013.01); *B32B 5/12* (2013.01); *B32B 5/26* (2013.01); *B29L 2031/3076* (2013.01); *B29L 2031/3085* (2013.01); *B32B 2307/544* (2013.01); *B32B 2307/546* (2013.01); *B32B 2605/18* (2013.01); *Y02T 50/433* (2013.01); *Y10T 156/10* (2015.01); *Y10T 428/24124* (2015.01)

(58) Field of Classification Search
CPC ............... B29L 2031/3076; B29L 2031/3085; B32B 5/12; B29C 70/202; B29C 70/30; Y02T 50/43; Y02T 50/433

USPC ........................................... 428/113, 98, 105
See application file for complete search history.

(56) References Cited

U.S. PATENT DOCUMENTS

| | | | |
|---|---|---|---|
| 4,810,167 A | | 3/1989 | Spoltman et al. |
| 6,641,893 B1 * | | 11/2003 | Suresh et al. ................. 428/105 |
| 7,575,194 B2 | | 8/2009 | Brown et al. |
| 7,807,249 B2 | | 10/2010 | Kismarton |
| 2006/0222837 A1 * | | 10/2006 | Kismarton ................. 428/297.4 |
| 2006/0243860 A1 | | 11/2006 | Kismarton |
| 2010/0121625 A1 * | | 5/2010 | Krog ................................ 703/6 |
| 2010/0320320 A1 | | 12/2010 | Kismarton |
| 2011/0045232 A1 | | 2/2011 | Kismarton |

FOREIGN PATENT DOCUMENTS

| | | | |
|---|---|---|---|
| WO | WO2011/128667 A1 | 10/2011 | |
| WO | WO 2011128667 A1 * | 10/2011 | ............. B29C 70/20 |

OTHER PUBLICATIONS

Chintapalli, "Preliminary Structural Design Optimization of an Aircraft Wing-Box," Presented at Concordia University, Montreal, Quebec, Aug. 2006, pp. 1-118.

EP search report dated Sep. 25, 2013 regarding application 13170678.0-1703, reference NAM/P127073EP00, applicant The Boeing Company, 6 pages.

\* cited by examiner

*Primary Examiner* — Brent O'Hern
(74) *Attorney, Agent, or Firm* — Yee & Associates, P.C.

(57) ABSTRACT

A composite laminate has a primary axis of loading and comprises a plurality resin plies each reinforced with unidirectional fibers. The laminate includes cross-plies with fiber orientations optimized to resist bending and torsional loads along the primary axis of loading.

20 Claims, 6 Drawing Sheets

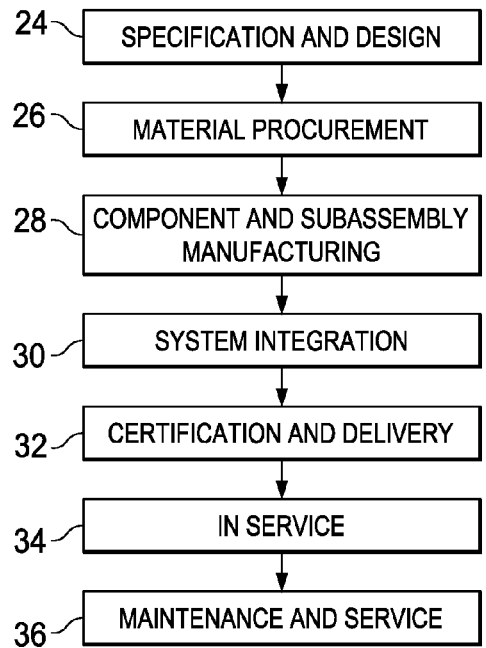
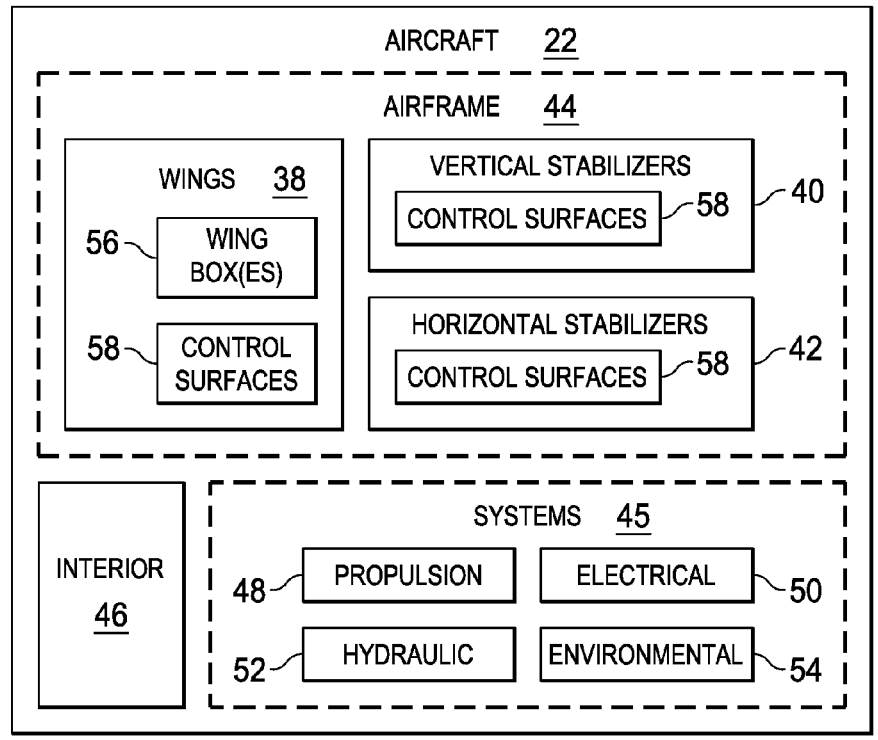

OPTIMIZED CROSS-PLY ORIENTATION IN COMPOSITE LAMINATES

BACKGROUND INFORMATION

1. Field

The present disclosure generally relates to composite laminates, such as those used in aircraft, and deals more particularly with a fiber reinforced resin laminate having cross-plies with optimized fiber orientations.

2. Background

Fiber reinforced resin laminates, such as carbon fiber reinforced plastics (CFRP), are widely used in aerospace and other applications because of their favorable strength-to-weight ratio. These composite laminates may be fabricated by laying up multiple plies of unidirectional reinforcing fibers held in a resin matrix, commonly known as prepreg. The plies in the layup may have differing fiber orientations arranged in an order that results in the required laminate strength and stiffness for a particular application. For example, in aircraft skins, the composite laminate may comprise groups of plies respectively having reinforcing fibers oriented at 0, +45, −45 and 90 degrees relative to a reference axis, with the majority of the plies being +/−45 degree plies. Although the number of plies in the laminate may vary at different locations along the wing, the angular orientation of the plies may be substantially constant over the length of the wing, and therefore not fully optimized to match performance requirements at individual locations on the wing. The use of these differing ply orientations allow the composite laminate structure to better resist bending, shear, torsional and bearing loads for a given application, but the use of constant orientations of the plies may result in a skin that is heavier than desired for a particular application.

Reducing the weight of composite laminate structures used in aircraft applications may improve the operating efficiency of an aircraft. The weight of such structures may depend, at least in part, on the number of plies in the laminate, which in turn may be determined by the strength and stiffness requirements for the particular application.

Accordingly, there is a need for a composite laminate that employs a reduced number of total plies while retaining the required laminate strength, rigidity and resistance to splitting and crack propagation. There is also a need for a composite laminate aircraft skin that optimizes the balance between the skin's bending and torsional strength and stiffness by using cross-plies that have optimized fiber orientations. Further, there is a need for a composite laminate skin exhibiting reduced weight through variation of the ply orientation over the wing length.

SUMMARY

The disclosed embodiments provide a composite laminate structure, such as an aircraft skin, that has reduced weight and may improve the laminate's structural strength, stiffness and resistance to splitting and crack propagation. The weight of the structure is reduced by using fewer 0 degree plies in the composite laminate. Reduction in the number of 0 degree plies in the composite laminate may also reduce labor and material costs. The reduction in the number of 0 degree plies is achieved without substantially reducing the composite laminate's shear properties, including torsional strength and stiffness, by optimizing the orientation of the cross-plies. Cross-ply orientation is optimized by more closely lining up the fiber orientations of the cross-plies with the primary longitudinal loads on the composite laminate structure. The benefits from the disclosed cross-ply optimization may be implemented in aircraft skins designs without substantial architectural changes in the wing design. A 3 to 5 percent reduction in the weight of a wingbox may be achieved using the disclosed ply optimization technique.

In some applications, the cross-plies may have fiber orientations within a range of approximately 33 and degrees, while in other applications, a cross-ply orientation within the range approximately 23 and 45 degrees may provide optimum composite laminate performance while achieving weight reduction. The disclosed composite laminates may be employed as skins on wings, stabilizers, control services or other structures used in aircraft. In a wing skin application of the disclosed composite laminate, for example and without limitation, it may be possible to achieve a three to five reduction in the weight of an aircraft wing box while increasing the bending performance of the wing box. The optimized orientation angle of the cross-plies may constant or variable over an area of a composite laminate. For example, and without limitation, the optimized orientation angle of the cross-plies may be variable in a span-wise direction along the length of a wing skin.

According to one disclosed embodiment, a composite laminate comprises at least one resin ply reinforced with unidirectional fibers having a substantially 0 degree fiber orientation relative to a reference axis, and at least one resin ply reinforced with unidirectional fibers having a substantially 90 degree fiber orientation relative to the reference axis. The composite laminate further comprises cross-plies of resin reinforced with unidirectional fibers each having ±θ degree fiber orientations relative to the reference axis, where θ is within the range of approximately 25 degrees and 43 degrees. In some applications, θ may be within the range of approximately 35 degrees and 40 degrees, and may vary in angular orientation over a length or within an area of the laminate.

According to another disclosed embodiment, a composite laminate aircraft skin is provided having a primary axis of loading. The aircraft skin comprises a first group of fiber reinforced resin plies having a fiber orientation substantially parallel to the axis of loading, a second group of fiber reinforced resin plies having a fiber orientation substantially perpendicular to the axis of loading, and a third group of fiber reinforced resin plies having a ±θ degree fiber orientation relative to the axis of loading, where θ is within the range of approximately 33 and 43 degrees. In some applications, θ may be within the range of approximately 35 and 40 degrees.

According to still another embodiment, a composite laminate aircraft skin having a primary axis of loading comprises at least one group of fiber reinforced resin cross-plies having fiber orientations that vary along the primary axis of loading. The fiber orientations of the cross-plies may vary within a range of approximately 25 and 45 degrees, and in some applications, the skin may further include cross-plies having fiber orientations of approximately 45 degrees relative to the axis of primary loading.

According to a further embodiment, a method is provided of manufacturing a composite laminate having a primary axis of loading. The method comprises assembling a multi-ply layup, including laying up a first set of resin plies each reinforced with unidirectional fibers having ±θ degree fiber orientations relative to the axis of loading, where θ is within the range of approximately 25 degrees and 43 degrees, laying up a second set of resin plies each reinforced with unidirectional fibers having a substantially 0 degree fiber orientation relative the primary axis of loading, and laying up a third set of resin plies each reinforced with unidirectional fibers having a substantially 90 degree fiber orientation relative the primary axis of loading. The method further includes laminating the first, second, and third sets of plies together. θ is within the range of approximately 35 degrees and 45 degrees. Laying up the first set of resin plies includes varying the fiber orientation θ along the primary axis of loading. Laying up the first set of resin plies and varying the fiber orientation may be performed using a computer controlled automatic fiber placement machine. The method may further comprise drilling at least one hole through the laminated plies, and/or cutting through at least an edge of the laminated plies.

According to still another embodiment, a method is provided of fabricating a composite aircraft wing skin having a primary axis of loading. The method comprises laying a plurality of resin plies reinforced with unidirectional fibers, including orienting a first set of the plies generally parallel to the primary axis of loading, and orienting a second set of the plies at ±θ degree fiber orientation relative to the primary axis of loading, where θ is within the range of approximately 25 degrees and 43 degrees. In some applications, θ may be is within the range of approximately 35 degrees and 45 degrees. Orienting the second set of plies includes varying the angular orientation of the second of plies along the length of the primary axis of loading. Varying the angular orientation of the second set of plies includes placing plies in the second set thereof in a first angular orientation along a first stretch, and placing plies in the second set in second angular orientations along a second stretch that are different from the first angular orientation. The first angular orientation may be substantially constant along the first stretch, and the second angular orientations may vary along the second stretch.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

FIG. 1 is an illustration of a flow diagram of aircraft production and service methodology.

FIG. 2 is illustration of a block diagram of an aircraft.

DETAILED DESCRIPTION

Figure 3:
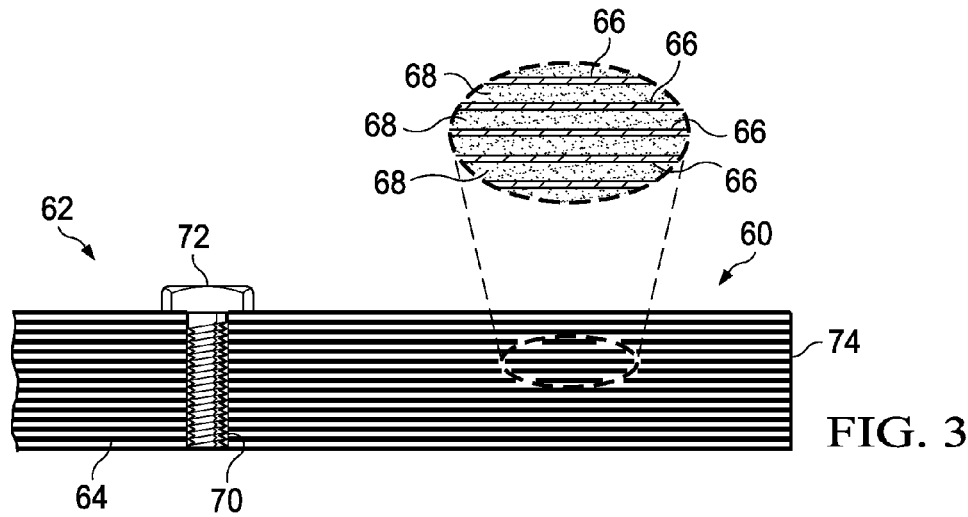
FIG. 3 is an illustration of a cross sectional view of a composite laminate having cross-plies with optimized fiber orientations.

The disclosed embodiments relate to a composite laminate and related fabrication method that may be employed to fabricate any of a variety of composite laminate structures. The embodiments may find use in numerous fields, particularly in the transportation industry, including for example, aerospace, marine, automotive applications and other applications where light weight composite laminates are employed. Thus, referring now to FIGS. 1 and 2, embodiments of the disclosure may be used in the context of an aircraft manufacturing and service method 20 as shown in FIG. 1, and an aircraft 22 as shown in FIG. 2. Aircraft applications of the disclosed embodiments may include, for example, without limitation, skins (not shown in FIG. 2 but discussed later) forming part of wings 38, a vertical stabilizer 40 and horizontal stabilizers 42, all of which form part of an airframe 44. During pre-production, exemplary method 20 may include specification and design 24 of the aircraft 22 and material procurement 26. During production, component and subassembly manufacturing 28 and system integration 30 of the aircraft 22 takes place. Thereafter, the aircraft 22 may go through certification and delivery 32 in order to be placed in service 34. While in service by a customer, the aircraft 22 is scheduled for routine maintenance and service 36, which may also include modification, reconfiguration, refurbishment, and so on.

Each of the processes of method 20 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 2, the aircraft 22 produced by exemplary method 20 may include, in addition to the airframe 44, a plurality of high-level systems 45 and an interior 46. The high-level systems 45 include one or more of a propulsion system 48, an electrical system 50, a hydraulic system 52, and an environmental system 54. Any number of other systems may be included. Each of the wings 38 may include one or more wing boxes 56. The wings 38, vertical stabilizer 40 and horizontal stabilizers 42 may each include one or more control surfaces 58.

Systems and methods embodied herein may be employed during any one or more of the stages of the production and service method 20. For example, components or subassemblies corresponding to production process 28 may be fabricated or manufactured in a manner similar to components or subassemblies produced while the aircraft 22 is in service. Also, one or more apparatus embodiments, method embodiments, or a combination thereof may be utilized during the production stages 28 and 30, for example, by substantially expediting assembly of or reducing the cost of an aircraft 22. Composite laminate structures manufactured according to the disclosed embodiments may increase the strength and stiffness of components of the aircraft 22 while reducing the aircraft weight. Similarly, one or more of apparatus embodiments, method embodiments, or a combination thereof may be utilized while the aircraft 22 is in service, for example and without limitation, to maintenance and service 36.

FIG. 3 illustrates one embodiment of the disclosed fiber reinforced composite resin laminate 60 that may be used to fabricate a composite structure or part 62, which in the application shown in FIG. 3, is substantially flat. However, the composite laminate 60 may have one or more curves, contours or other shapes that are achieved by well-known composite layup techniques and tooling (not shown). The composite laminate 60 comprises a plurality of laminated plies 64. Each of the plies 64 comprises unidirectional reinforcing fibers 66 held in polymer resin matrix 68. The reinforcing fibers 66 in the matrix 68 are not limited to any particular composition, and may comprise, without limitation, carbon, fiberglass, Kevlar, boron, titanium or ceramics to name only a few. The matrix 68 may comprise any of a wide range of polymer resins, including for example and without limitation, epoxy. As will be discussed below, the angular orientation of the unidirectional fibers 66 of the plies may vary in accordance with a predetermined ply schedule (not shown) selected to achieve desired performance specifications for the part 62.

Figure 4:
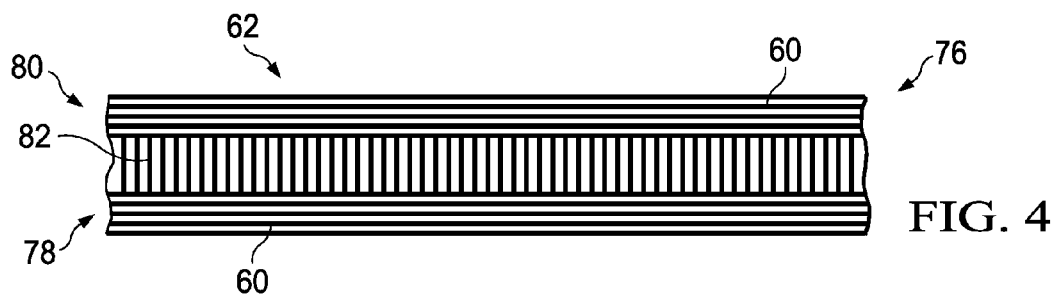
FIG. 4 is an illustration of a cross sectional view of a composite sandwich panel employing the composite laminate of FIG. 3.

The disclosed laminate 60 may be combined with other structures to form a part 62 such as the composite sandwich panel 76 shown in FIG. 4. In this example, the laminate 60 is employed 76 as inner and outer facesheets 78, 80 between which a suitable core 82 may be sandwiched.

Figure 5:
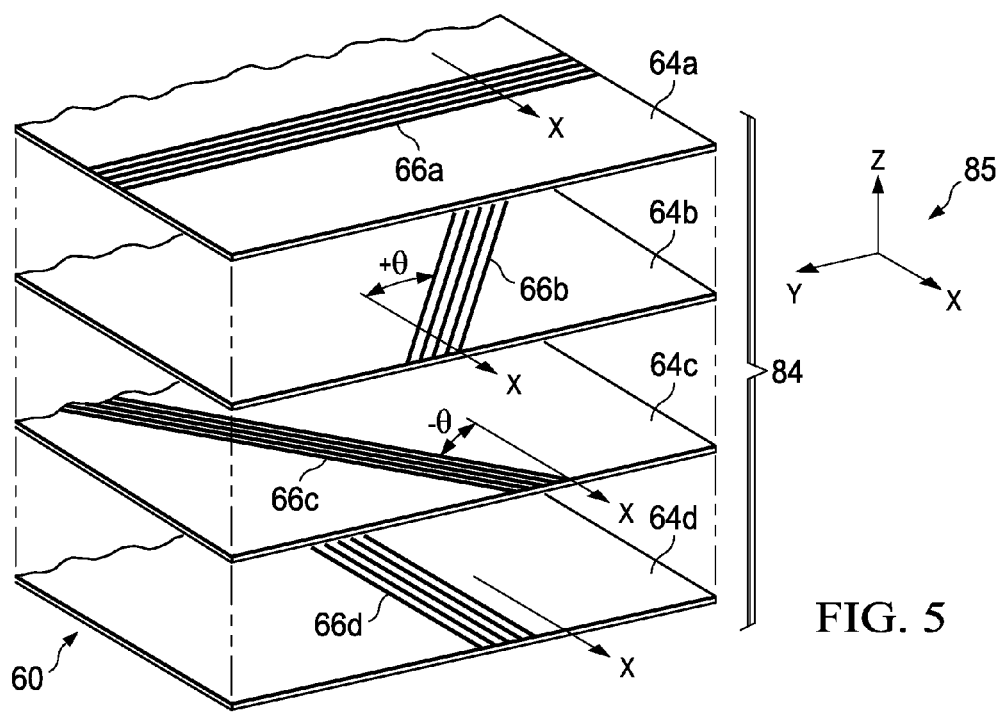
FIG. 5 is an illustration of an exploded, perspective view of several individual plies of the composite laminate of FIG. 3.

Attention is now directed to FIG. 5 which illustrates several plies 64a-64d of a part layup 84 used to fabricate the disclosed composite laminate 60. Each of the plies 64a-64d includes unidirectional reinforcing fibers 66a-66d having a predetermined angular orientation relative to an axis of loading or reference axis which, in the illustrated embodiment, is indicated as the X axis in an orthogonal coordinate system 85. The plies 64a-64d may each include a unidirectional prepreg tape or tows that may be laid up using automated equipment, such as without limitation, by a computer controlled automated fiber placement machine (not shown) which is capable of controlling the fiber orientation of the plies 64a-64d. Alternatively, the plies 64a-64d may be laid up by hand. Ply 64a includes reinforcing fibers 66a that have an angular orientation of approximately 90 degrees relative to the X axis, while ply 64d includes reinforcing fibers 66d that have an angular orientation of approximately 0 degrees relative to the X axis. Thus, reinforcing fibers 66a of ply 64a are generally perpendicular or orthogonal to the X axis while the reinforcing fibers 66d of ply 64d are generally parallel to the X axis. As used herein, "90 degrees" is intended to include fiber orientations that are approximately 90+/−5 degrees, and "0 degrees" is intended to include fiber orientations that are 0+/−5 degrees.

Ply 64b includes unidirectional reinforcing fibers 66b having angular fiber orientations +θ relative to the X axis, while ply 64c includes unidirectional reinforcing fibers 66c having angular fiber orientations −θ relative to the X axis. The plies 64b and 64c having fiber orientations of +θ and −θ respectively may sometimes also be referred to herein as "cross-plies" having angular orientations of ±θ, and ±θ may sometimes be referred to as the "cross-ply angle". As will be discussed below, the particular cross-ply angle ±θ is optimized to maintain or improve the performance of the composite laminate 60 while reducing its weight. In some applications, the cross-ply angle ±θ may be within a range of approximately 10 and 43 degrees, while in other applications, desired results may be obtained where the cross-ply angle ±θ is within a range of approximately 33 and 43 degrees. In still other applications, use of a cross-ply angle ±θ within a range of approximately 35 and 40 degrees may provide beneficial or useful results.

The cross-ply angle ±θ may vary in magnitude over one or more areas of the part 62 (FIG. 3) in order to achieve a localized optimum balance between bending strength and stiffness, tension loading, torsional strength and stiffness, and laminate weight. For example, in an embodiment discussed below, the cross-ply angle ±θ may vary linearly or non-linearly across a laminate structure from approximately 10 degrees to approximately 43 degrees. It may also be possible to vary the cross-ply angle ±θ of overlying cross-plies 64b, 64c in the same area of the laminate 60. In other words, different ones of the cross-plies 64b, 64c in a given area of the laminate 60 may have respectively different cross-ply angles ±θ. The particular angle ±θ used in the cross-plies 64b, 64c will depend on the specifications and performance requirements of the particular application, as well as localized characteristics of the laminate structure. In some embodiments, the laminate 60 may employ +45 degree plies (not shown) and −45 degree plies (not shown) in some areas in addition to cross-plies having angular orientations of ±θ.

For simplicity of illustration, only four plies 64a-64d are shown in the example of FIG. 5, however, in practical embodiments, the part layup 84 may comprise a number of interspersed sets or groups of the plies 64a-64d respectively having fiber orientations of 0 degrees, 90 degrees, ±θ degrees and −θ degrees, laid up according to a predetermined ply schedule to achieve the desired part characteristics and performance. For example, in an application where the composite laminate 60 is employed as a wing skin of an aircraft, approximately 30% of the total number of plies 64 may have a generally 0 degree angle fiber orientation, approximately 60% of the total number of plies 64 may have fiber orientations of ±θ degrees, and approximately 10% of the total number of plies 64 may have fiber orientations of approximately 90 degrees.

By employing cross-plies 64b, 64c having optimized fiber orientations of +θ, −θ respectively, fewer zero degree plies 64d may be required for a particular application, such as a wing skin. Fewer 0 degree plies may be needed because the fiber orientations of the cross-plies 64b, 64c more closely line up with the primary axis of loading, i.e. the X axis, compared to conventionally used ±45 degree plies, thereby contributing to the bending strength and stiffness of the laminate 60 while maintaining the required level of torsional strength and stiffness. A small loss of torsional strength and stiffness resulting from the disclosed cross-ply optimization technique may not be particularly detrimental in most wing skin applications because the skins are designed with relatively large margins for torsional strength and stiffness.

A typical wing skin laminate may comprise 30/60/10 percent of 0, 45 and 90 degree plies, respectively. Since the majority of the plies may be 45 degree plies, it may be appreciated that optimizing the angle of the cross-plies may result in the need for fewer 0 degree plies 64d. As a result of the use of fewer 0 degree plies 64d, the weight of the composite laminate 60 may be reduced in those applications where most of the composite load resistance is in the 90 degree direction, which in the illustrated example is substantially parallel to the Y axis. Additionally, the use of cross-plies having angular fiber orientations ±θ may boost the bearing strength of the 0 degree plies 64d while assisting in the suppression or delay of potential splitting and/or crack propagation in the 0 degree plies 64d and the 90 degree plies 64a since the fibers 66b, 66c of the cross-plies 64b, 64c cross over and tie together the fibers 66a, 66d of the 0 degree plies 64d and the 90 degree plies 64a, respectively. The ability of the cross-plies 64b, 64c to suppress or delay ply splitting and crack propagation may be particularly important where holes 70 (FIG. 3) are drilled in the laminate 60 to receive fasteners 72, or where the edges 74 and thus the fibers 66 of the laminate are cut when the part 62 is trimmed to final dimensions. In one typical wing skin application of the disclosed embodiments, the number of 0 degree plies 64 used in the composite laminate 60 may be reduced between one and five percent, depending upon required performance specifications of the part and the ply schedule used to form the part layup 84.

Figure 6:
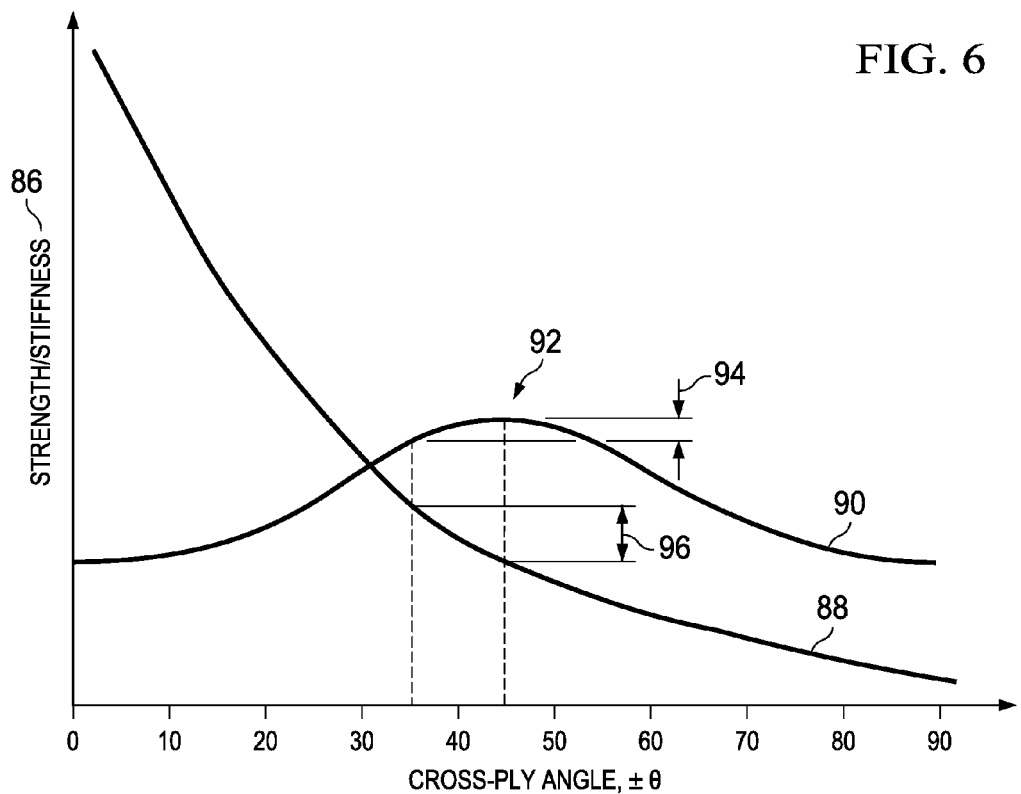
FIG. 6 is an illustration of a graph showing the relationship between strength/stiffness and cross-ply angle.

Attention is now directed to FIG. 6 which graphically illustrates the relationship between strength/stiffness 86 of the previously discussed laminate 60, and the cross-ply fiber orientation angle ±θ. The bending strength/stiffness of the laminate 60 is indicated by plot line 88, while the torsional strength/stiffness of the laminate 60 is indicated by the plot line 90. The torsional strength/stiffness 90 can be seen to gradually increase with increasing cross-ply angle ±θ to a peak value at 92, which corresponds to a ±45 degree cross-ply angle and then gradually decrease as the cross-ply angle increases above ±45 degrees. As shown by the plot line 88, however, bending strength/stiffness of the composite laminate 60 increases relatively rapidly as the cross-ply angle ±θ decreases below 45 degrees.

Figure 7:
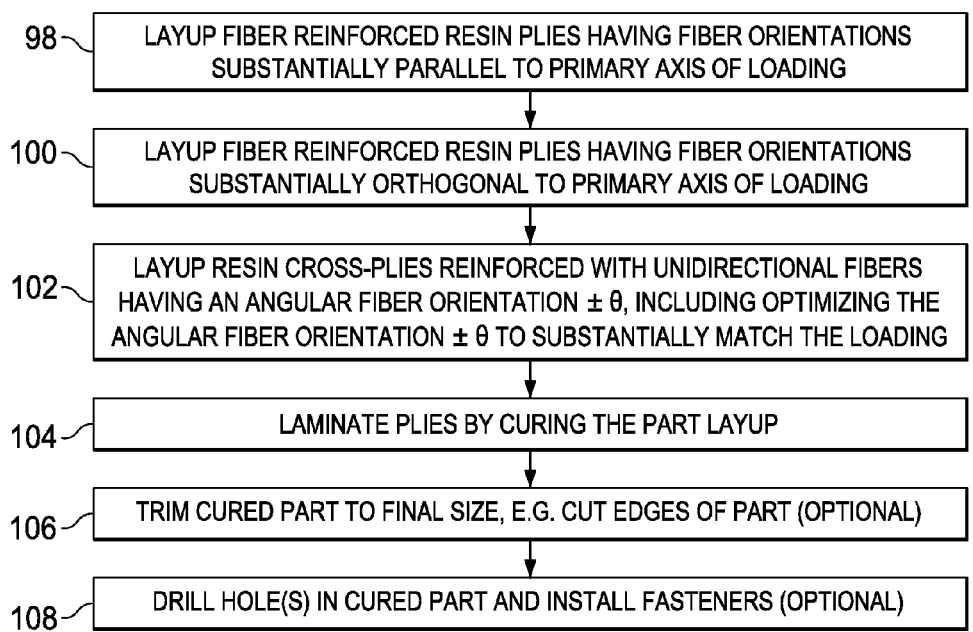
FIG. 7 is an illustration of a flow diagram of a method of fabricating the disclosed composite laminate.

FIG. 7 broadly illustrates the overall steps of one embodiment of a method of fabricating a fiber reinforced resin laminate 60 exhibiting improved bending strength/stiffness by optimizing the angular orientation ±θ of the cross-plies 64b, 64c to substantially match loads applied to the laminate 60. At 98, fiber reinforced resin plies 64d are laid up that have fiber orientations that are substantially parallel to the primary axis X of loading of the laminate 60. At step 100, fiber reinforced resin plies 64a are laid up that have fiber orientations that are substantially orthogonal to the primary axis X of loading. At step 102, resin cross-plies 64b, 64c are laid up which have angular fiber orientations ±θ, including optimizing the angular fiber orientation ±θ to substantially match the loading on the laminate 60. The plies 64b laid up at step 102 may have an angular orientation +θ within the range of approximately 10 and 43 degrees, and may include plies having fiber orientations within the range of approximately 33 and 43 degrees, and/or 35 and 40 degrees. The plies 64c laid up at step 102 may have an angular fiber orientation −θ within the range of approximately −10 and −43 degrees, and may include plies having fiber orientations within the range of approximately −33 and −43 degrees, and/or −35 and −40 degrees At 100, a second set of fiber reinforced resin plies 64d is laid up, wherein each of the plies 64d has a generally 0 degree fiber orientation relative to the primary axis of loading. At 102, a third set of fiber reinforced resin plies 64a is laid up, wherein each of the plies 64a has a generally 90 degree fiber orientation relative to the primary axis of loading. At 104, the plies of the layup are laminated together by consolidating and curing the layup. At 106, optionally, the cured part may be trimmed to final size by cutting one or more edges 74 (FIG. 3) of the part 62. At 108, one or more holes 70 (FIG. 3) may optionally be drilled in the cured part 62 and fasteners 72 installed in the holes 70.

Figure 8:
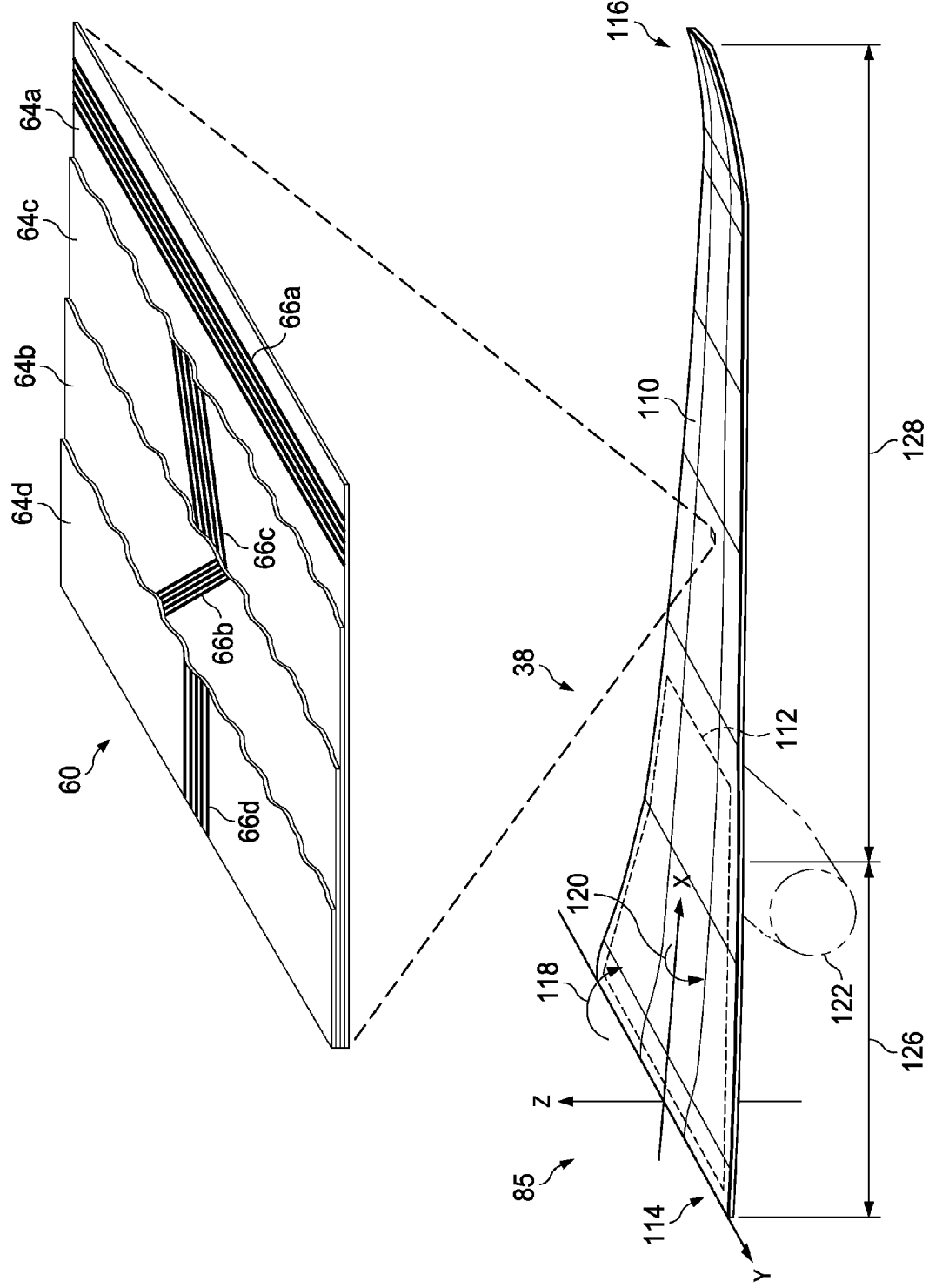
FIG. 8 is an illustration of an isometric view of wing skin employing the disclosed composite laminate.

FIG. 8 illustrates the use the disclosed composite laminate 62 as a skin 110 on an aircraft wing 38. The wing 38 may include a wing box 112 and an attached engine 122, both indicated in the phantom. The wing 38 extends in a span-wise direction roughly corresponding to the X axis of the coordinate system 85, from a root 114 to a tip 116. The fore and aft direction of the wing 38 corresponds to the Y axis, and the vertical direction of the wing 38 corresponds to the Z axis. The X axis forms the primary axis of loading of the wing 38, including the skin 110. When in service, the wing 38 is subject to bending forces 118 that are applied to the wing 38 along axes substantially parallel to the Y axis, and is also subject to torsional forces 120 applied to the wing 38 about axes that are substantially parallel to the X axis. The bending forces 118 and the torsional forces 120 applied to the wing 38 may not be constant along the wing's length. For example, the requirement to resist torsional forces 120 at the wing root 114 may be substantially greater than the requirement to resist torsional forces 114 at the wing tip 116. Consequently, the wing 38 may be designed to have different amounts of torsional and bending rigidity at different points along its length.

By optimizing the orientation angle ±θ of the cross-plies in the laminate 60 forming the skin 110, the bending strength and stiffness of the wing 38 and the skin 110 may be increased. Due to this increase in bending strength and stiffness, fewer 0 degree plies may be used in the laminate 60, resulting in a corresponding decrease in the weight of the skin 110 and thus of the wing 38. In other words, because some of the plies are better oriented to resist the main load paths, fewer plies are required that are oriented in a cross direction to the main load paths. This optimization of the cross-ply orientation angle ±θ results in a weight reduction of skin 110. Also, optimization of the cross ply orientation angle ±θ allows the wing skin 38 to be tailored at different points or stretches to better match local requirements to resist bending forces 118 and torsional forces 120. While a wing 38 is shown in FIG. 8 to exemplify one use of the disclosed composite laminate 60, the laminate 60 may be employed as a skin 110 on other parts of the aircraft 22 (FIG. 2), including but not limited to vertical stabilizer 40, horizontal stabilizers 42 and control surfaces 58.

Figure 9:
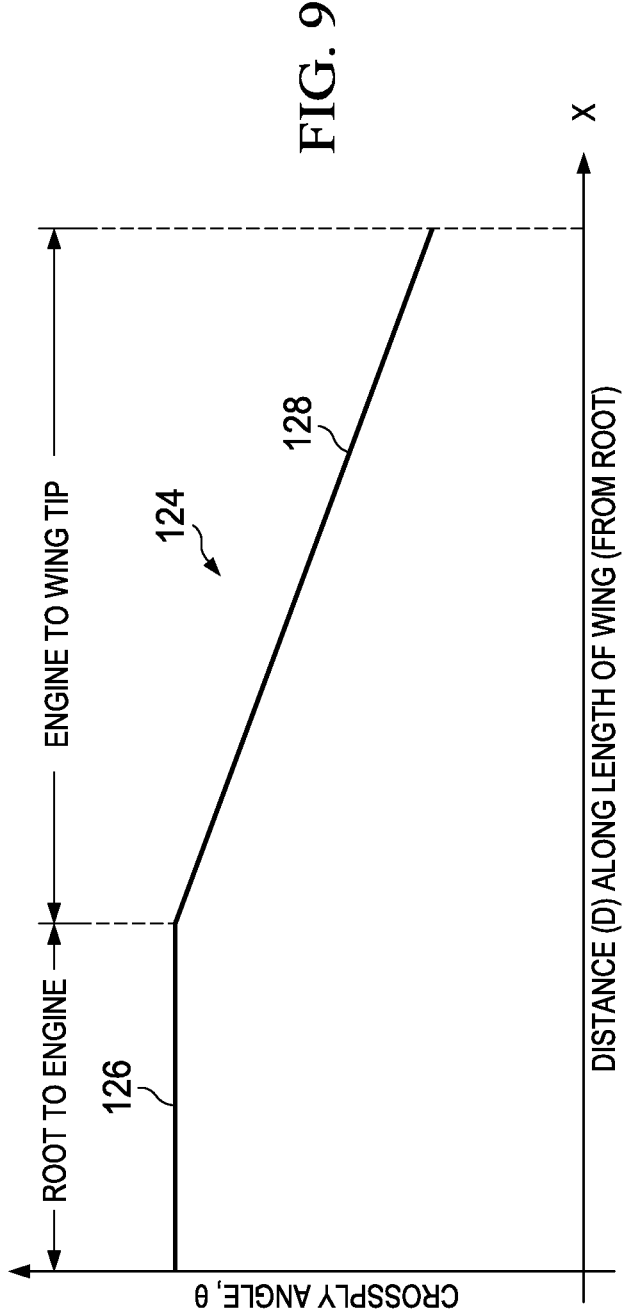
FIG. 9 is an illustration of a graph showing variation of the cross-ply angle along the length of a wing skin.

As previously mentioned, in some applications, it may be possible to vary the cross-ply angle ±θ over one or more local areas of the laminate 60 in order to optimize the local or overall performance of the laminate and/or reduce its weight. For example, FIG. 9 illustrates how the cross-ply angle ±θ may be designed to vary over the length of the wing skin 110 shown in FIG. 8, as a function of the distance D from the wing root 114. In this example, the cross-ply angle ±θ of the wing skin 110 may be substantially linear and constant 126 at one orientation along a first stretch from the wing root 114 to the engine 122, but may decrease linearly 128 in orientation along a second stretch from the engine 122 to the wing tip 116. For example, in one practical wing skin application, the cross-ply angle ±θ of the wing skin 110 may remain substantially constant at approximately ±43 degrees from the wing root 114 to the engine 122, and decrease linearly in orientation from the engine 122 to approximately ±10 degrees at the wing tip 116. In other embodiments, the cross-ply angle ±θ may decrease non-linearly along all or a portion of the length of the wing 38. This cross ply angle optimization technique may thus be employed to "tailor" the wing skin 110 to meet differing requirements to resist bending loads and torsional loads in differing areas along the length of the wing 38.

Figure 10:
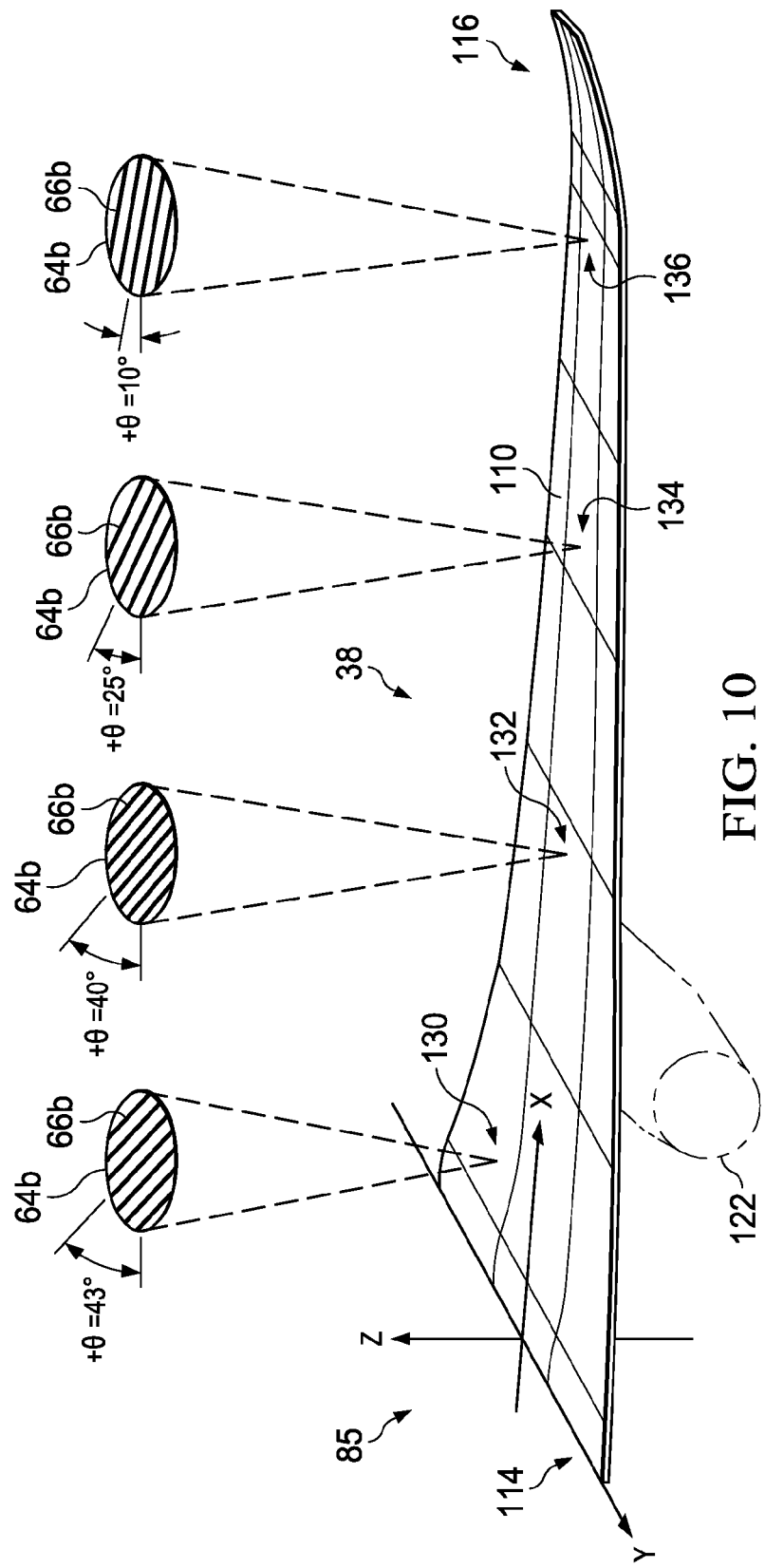
FIG. 10 is an illustration similar to FIG. 8, but showing how the wing skin cross-plies may vary in orientation along the length of the wing.

FIG. 10 illustrates still another example of cross-ply optimization of a wing skin 110 along its length (span-wise direction) that may reduce the weight of a wing 38 while satisfying or exceeding a desired set of performance requirements. For simplicity, only a portion of a single ply 64b is shown at various points 130, 132, 134, 136 along the length of the wing 38. In this example, at the wing root 114 where the need for torsional strength and stiffness may be highest, the cross-ply orientation angle +θ is 43 degrees, while just outboard of the engine 122, the cross-ply orientation angle +θ decreases to 40 degrees. At approximately mid-span between the engine 122 and the wing tip 116, the cross-ply orientation angle +θ decreases further to 25 degrees. At the wing tip 116 where the requirement for torsional strength and stiffness may be lowest, the cross-ply orientation angle +θ decreases further to 10 degrees. The cross-ply orientation angle +θ may change from wing root 114 to wing tip 116 either continuously at a constant or non-constant rate, or in a step-wise manner from point-to-point 130-136. The specific cross-ply orientation angles +θ shown in FIG. 10 are merely illustrative of one practical application and are not intended to be limiting. An optimized variation of cross-ply angle −θ in the span-wise direction of the wing 38 may be similar to the optimization of the cross-ply orientation angle +θ described above. The maximum and minimum values of the cross-ply ±θ angle may vary with the application, including the particular wing design and performance requirements.

The description of the various embodiments has been presented for purposes of illustration and description, and is not intended to be exhaustive or limited to the embodiments in the form disclosed. Many modifications and variations will be apparent to those of ordinary skill in the art. Further, different embodiments may provide different advantages as compared to other embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A composite laminate aircraft wing skin having an axis of loading in-plane with the aircraft wing skin, the composite laminate aircraft skin comprising:
   a plurality of resin plies in the aircraft wing skin reinforced with unidirectional fibers, wherein the plurality of resin plies comprises:
   a first set of plies having a substantially straight first fiber orientation of substantially 0 degrees relative to the axis of loading, the first set of plies extending a length of the wing, wherein the axis of loading substantially bisects the wing; and
   at least one first set of cross-plies having a second fiber orientation of ±θ degrees relative to the axis of loading and the first fiber orientation, wherein θ is determined while the composite laminate aircraft wing skin is in a static position, where θ is greater than or equal to approximately 25 degrees and less than or equal to approximately 43 degrees.

2. The composite laminate aircraft wing skin of claim 1, wherein θ is within a range of approximately 33 degrees and 43 degrees.

3. The composite laminate aircraft wing skin of claim 1, wherein θ is within a range of approximately 35 degrees and 40 degrees.

4. The composite laminate aircraft wing skin of claim 1, wherein the θ degree fiber orientations of the cross-plies vary along the axis of loading.

5. The composite laminate aircraft wing skin of claim 1, wherein the θ degree fiber orientations of the cross-plies vary within an area of the composite laminate aircraft wing skin.

6. The composite laminate aircraft wing skin of claim 1, wherein the θ degree fiber orientations of the cross-plies are selected to match loading of composite laminate aircraft wing skin along the axis of loading.

7. The composite laminate aircraft wing skin of claim 1, wherein the plurality of resin plies further includes:
   at least one resin ply reinforced with unidirectional fibers having a substantially 0 degree fiber orientation relative to the axis of loading, and
   at least one resin ply reinforced with unidirectional fibers having a substantially 90 degree fiber orientation relative to the axis of loading.

8. A composite laminate aircraft wing skin having an axis of loading in-plane with the aircraft wing skin, the composite laminate aircraft skin comprising:
   a first group of fiber reinforced resin plies extending a length of the wing and having a first fiber orientation substantially straight and parallel to the axis of loading of the composite laminate aircraft skin, wherein the axis of loading substantially bisects the wing, wherein the first fiber orientation is determined while the composite laminate aircraft wing skin is in a static position;
   a second group of fiber reinforced resin plies having second a fiber orientation substantially perpendicular to the axis of loading of the composite laminate aircraft skin, wherein the second fiber orientation is determined while the composite laminate aircraft wing skin is in a static position; and
   a third group of fiber reinforced resin cross-plies extending transverse to the plies in the first and second groups thereof and having a ±θ degree fiber orientation relative to the axis of loading of the composite laminate aircraft skin and the first fiber orientation, wherein θ is determined while the composite laminate aircraft wing skin is in a static position, where θ is optimized to resist bending loads and torsional loads applied to the skin, wherein θ is greater than or equal to approximately 25 degrees and less than approximately 43 degrees.

9. The composite laminate aircraft wing skin of claim 8, wherein θ is within a range of approximately 33 and 43 degrees.

10. The composite laminate aircraft wing skin of claim 8, wherein θ is within a range of approximately 35 and 40 degrees.

11. The composite laminate aircraft wing skin of claim 8, wherein θ varies across the composite laminate aircraft skin along the axis of loading.

12. The composite laminate aircraft wing skin of claim 8 wherein:
   the composite laminate aircraft skin is a wing skin having a wing root and a wing tip,
   θ is approximately 43 degrees in the area of the wing root, and
   θ is approximately 10 degrees at the wing tip.

13. The composite laminate aircraft wing skin of claim 8, wherein the first group, the second group, and the third group of fiber reinforced resin plies comprise a total number of plies, and wherein the second group comprises approximately 10% of the total number of plies.

14. A composite laminate aircraft wing skin having an axis of loading in-plane with the composite laminate aircraft wing skin, comprising:
   a first number of fiber reinforced resin plies extending a length of the wing having substantially straight first fiber orientations of approximately 0 degrees relative to the axis of loading of the composite laminate aircraft skin, wherein the axis of loading substantially bisects the wing, wherein the fiber orientations are determined while the composite laminate aircraft wing skin is in a static position;
   a second number of fiber reinforced resin plies having second fiber orientations of approximately 90 degrees relative to the axis of loading of the composite laminate aircraft skin, wherein the fiber orientations are determined while the composite laminate aircraft wing skin is in a static position, and a third number of fiber reinforced resin cross-plies having ±θ degree fiber orientations that vary relative to the axis of loading of the composite laminate aircraft skin and the first fiber orientations, where θ is greater than or equal to approximately 10 degrees and less than or equal to approximately 43 degrees, wherein θ is determined while the composite laminate aircraft wing skin is in a static position.

15. The composite laminate aircraft wing skin of claim 14, wherein θ varies within a range of approximately 10 and 43 degrees along the axis of loading.

16. The composite laminate aircraft wing skin of claim 14, wherein θ decreases in a step-wise manner along the axis of loading.

17. A composite laminate aircraft wing skin having a primary axis of loading in-plane with the composite laminate aircraft wing skin, comprising:
 a plurality of resin plies each reinforced with unidirectional fibers, wherein the plurality of resin plies comprises:
  a first set of plies having a substantially straight first fiber orientation of substantially 0 degrees relative to the axis of loading, the first set of plies extending a length of the wing,
 wherein the axis of loading substantially bisects the wing; and
  at least one first set of cross-plies having a second fiber orientation of ±θ degrees relative to the primary axis of loading and the first fiber orientation, where θ is greater than or equal to approximately 25 degrees and less than or equal to approximately 43 degrees, wherein θ is determined while the composite laminate aircraft wing skin is in a static position and optimized to resist bending and torsional loads along the primary axis of loading of the composite laminate aircraft wing skin, wherein the optimized fiber orientations vary in a span-wise direction along the aircraft wing skin.

18. The composite laminate aircraft wing skin of claim 17, wherein θ decreases linearly in a span-wise direction along the aircraft skin.

19. The composite laminate aircraft wing skin of claim 17, wherein θ decreases non-linearly in a span-wise direction along the aircraft skin.

20. The composite laminate aircraft wing skin of claim 17, wherein θ varies within a range of approximately 10 to 43 degrees from a wing tip to a wing root.

\* \* \* \* \*